United States Patent
Hinde et al.

(10) Patent No.: US 7,113,911 B2
(45) Date of Patent: Sep. 26, 2006

(54) VOICE COMMUNICATION CONCERNING A LOCAL ENTITY

(75) Inventors: Stephen John Hinde, Bristol (GB); Paul St John Brittan, Claverham (GB); Marianne Hickey, Bristol (GB); Lawrence Wilcock, Malmesbury (GB); Guillaume Belrose, Bristol (GB); Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 820 days.

(21) Appl. No.: 09/990,768

(22) Filed: Nov. 21, 2001

(65) Prior Publication Data

US 2002/0082839 A1 Jun. 27, 2002

(30) Foreign Application Priority Data

Nov. 25, 2000 (GB) .............................. 0028810

(51) Int. Cl.
*G10L 21/00* (2006.01)

(52) U.S. Cl. ............... 704/270.1; 704/275; 340/825.29; 340/825.69; 715/700

(58) Field of Classification Search ................ 715/700; 340/825.29, 825.69; 704/275, 231, 258, 270.1; 345/700, 473; 701/211; 709/205; 348/14.12
See application file for complete search history.

(56) References Cited

U.S. PATENT DOCUMENTS

| | | | | |
|---|---|---|---|---|
| 5,907,351 A | * | 5/1999 | Chen et al. ............... | 348/14.12 |
| 5,929,848 A | * | 7/1999 | Albukerk et al. ........... | 345/700 |
| 5,943,427 A | | 8/1999 | Massie et al. ................ | 381/17 |

(Continued)

FOREIGN PATENT DOCUMENTS

| | | |
|---|---|---|
| DE | 197 47 745 A1 | 7/1999 |
| EP | 0 820 028 A2 | 1/1998 |
| GB | 2 327 564 A | 1/1999 |
| GB | 2 348 777 A | 10/2000 |
| GB | 2 359 215 A | 8/2001 |
| WO | 00/30329 A1 | 5/2000 |

OTHER PUBLICATIONS

Billinghurst, M., et al., "A Wearable Spatial Conferencing Space," *Proceedings of the Second International Symposium on Wearable Computers*, Pittsburgh, Pennsylvania, 8 pages total (Oct. 19–20, 1998).

King, R.B., et al., "The Impact of Signal Bandwidth on Auditory Localization: Implications for the Design of Three-Dimensional Audio Displays," *Human Factors*, vol. 39, No. 2, pp. 287–295 (1997).

Sawhney, N., et al., "Speaking and Listening on the Run: Design for Wearable Audio Computing," *IEEE*, pp. 108–115 (1998).

(Continued)

*Primary Examiner*—Susan McFadden
*Assistant Examiner*—Huyen X. Vo

(57) ABSTRACT

A local entity without its own means of voice communication is provided with the semblance of having a voice interaction capability. This is done by providing a beacon device at or near the entity, the beacon device transmitting, over a short-range communication link, contact data identifying a voice service associated with, but hosted separately from, the entity. The transmitted contact data is picked up by equipment carried by a nearby person and used to contact the voice service over a wireless network. The person then interacts with the voice service, the latter acting as a voice proxy for the local entity. The contact data can be presented to the user in other ways, for example, by being inscribed on the local entity for scanning or user input into the equipment.

60 Claims, 5 Drawing Sheets

U.S. PATENT DOCUMENTS

| | | | | | |
|---|---|---|---|---|---|
| 6,067,095 | A | * | 5/2000 | Danieli | 345/473 |
| 6,085,148 | A | * | 7/2000 | Jamison et al. | 701/211 |
| 6,144,991 | A | * | 11/2000 | England | 709/205 |
| 2002/0077826 | A1 | | 6/2002 | Hinde et al. | 704/270 |
| 2002/0078148 | A1 | | 6/2002 | Hinde et al. | 709/203 |
| 2002/0082838 | A1 | | 6/2002 | Hinde et al. | 704/270.1 |

OTHER PUBLICATIONS

"Introduction and Overview of W3C Speech Interface Framework," *W3C Working Draft*, 21 pages (Sep. 11, 2000).

VoiceXML Forum Version 1.00, 101 pages (Mar. 7, 2000).

Bederson, B.B., "Audio Augmented Reality: A Prototype Automated Tour Guide," 4 pages, located at Internet address: <http://www.cs.umd.edu/-bederson/papers/chi-95-aar/index.html>.

* cited by examiner

VOICE COMMUNICATION CONCERNING A LOCAL ENTITY

FIELD OF THE INVENTION

The present invention relates to voice services and in particular, but not exclusively, to a method of providing for voice interaction with a local dumb device.

BACKGROUND OF THE INVENTION

In recent years there has been an explosion in the number of services available over the World Wide Web on the public internet (generally referred to as the "web"), the web being composed of a myriad of pages linked together by hyperlinks and delivered by servers on request using the HTTP protocol. Each page comprises content marked up with tags to enable the receiving application (typically a GUI browser) to render the page content in the manner intended by the page author; the markup language used for standard web pages is HTML (Hyper Text Markup Language).

However, today far more people have access to a telephone than have access to a computer with an Internet connection. Sales of cellphones are outstripping PC sales so that many people have already or soon will have a phone within reach where ever they go. As a result, there is increasing interest in being able to access web-based services from phones. 'Voice Browsers' offer the promise of allowing everyone to access web-based services from any phone, making it practical to access the Web any time and any where, whether at home, on the move, or at work.

Voice browsers allow people to access the Web using speech synthesis, pre-recorded audio, and speech recognition. FIG. 1 of the accompanying drawings illustrates the general role played by a voice browser. As can be seen, a voice browser is interposed between a user 2 and a voice page server 4. This server 4 holds voice service pages (text pages) that are marked-up with tags of a voice-related markup language (or languages). When a page is requested by the user 2, it is interpreted at a top level (dialog level) by a dialog manager 7 of the voice browser 3 and output intended for the user is passed in text form to a Text-To-Speech (TTS) converter 6 which provides appropriate voice output to the user. User voice input is converted to text by speech recognition module 5 of the voice browser 3 and the dialog manager 7 determines what action is to be taken according to the received input and the directions in the original page. The voice input/output interface can be supplemented by keypads and small displays.

In general terms, therefore, a voice browser can be considered as a largely software device which interprets a voice markup language and generate a dialog with voice output, and possibly other output modalities, and/or voice input, and possibly other modalities (this definition derives from a working draft, dated September 2000, of the Voice browser Working Group of the World Wide Web Consortium).

Voice browsers may also be used together with graphical displays, keyboards, and pointing devices (e.g. a mouse) in order to produce a rich "multimodal voice browser". Voice interfaces and the keyboard, pointing device and display maybe used as alternate interfaces to the same service or could be seen as being used together to give a rich interface using all these modes combined.

Some examples of devices that allow multimodal interactions could be multimedia PC, or a communication appliance incorporating a display, keyboard, microphone and speaker/headset, an in car Voice Browser might have display and speech interfaces that could work together, or a Kiosk.

Some services may use all the modes together to provide an enhanced user experience, for example, a user could touch a street map displayed on a touch sensitive display and say "Tell me how I get here?". Some services might offer alternate interfaces allowing the user flexibility when doing different activities. For example while driving speech could be used to access services, but a passenger might used the keyboard.

FIG. 2 of the accompanying drawings shows in greater detail the components of an example voice browser for handling voice pages 15 marked up with tags related to four different voice markup languages, namely:

tags of a dialog markup language that serves to specify voice dialog behaviour;

tags of a multimodal markup language that extends the dialog markup language to support other input modes (keyboard, mouse, etc.) and output modes (large and small screens);

tags of a speech grammar markup language that serve to specify the grammar of user input; and tags of a speech synthesis markup language that serve to specify voice characteristics, types of sentences, word emphasis, etc.

When a page 15 is loaded into the voice browser, dialog manager 7 determines from the dialog tags and multimodal tags what actions are to be taken (the dialog manager being programmed to understand both the dialog and multimodal languages 19). These actions may include auxiliary functions 18 (available at any time during page processing) accessible through APIs and including such things as database lookups, user identity and validation, telephone call control etc. When speech output to the user is called for, the semantics of the output is passed, with any associated speech synthesis tags, to output channel 12 where a language generator 23 produces the final text to be rendered into speech by text-to-speech converter 6 and output to speaker 17. In the simplest case, the text to be rendered into speech is fully specified in the voice page 15 and the language generator 23 is not required for generating the final output text; however, in more complex cases, only semantic elements are passed, embedded in tags of a natural language semantics markup language (not depicted in FIG. 2) that is understood by the language generator. The TTS converter 6 takes account of the speech synthesis tags when effecting text to speech conversion for which purpose it is cognisant of the speech synthesis markup language 25.

User voice input is received by microphone 16 and supplied to an input channel of the voice browser. Speech recogniser 5 generates text which is fed to a language understanding module 21 to produce semantics of the input for passing to the dialog manager 7. The speech recogniser 5 and language understanding module 21 work according to specific lexicon and grammar markup language 22 and, of course, take account of any grammar tags related to the current input that appear in page 15. The semantic output to the dialog manager 7 may simply be a permitted input word or may be more complex and include embedded tags of a natural language semantics markup language. The dialog manager 7 determines what action to take next (including, for example, fetching another page) based on the received user input and the dialog tags in the current page 15.

Any multimodal tags in the voice page 15 are used to control and interpret multimodal input/output. Such input/ output is enabled by an appropriate recogniser 27 in the input channel 11 and an appropriate output constructor 28 in the output channel 12.

Whatever its precise form, the voice browser can be located at any point between the user and the voice page server. FIGS. 3 to 5 illustrate three possibilities in the case where the voice browser functionality is kept all together; many other possibilities exist when the functional components of the voice browser are separated and located in different logical/physical locations.

In FIG. 3, the voice browser 3 is depicted as incorporated into an end-user system 8 (such as a PC or mobile entity) associated with user 2. In this case, the voice page server 4 is connected to the voice browser 3 by any suitable data-capable bearer service extending across one or more networks 9 that serve to provide connectivity between server 4 and enduser system 8. The data-capable bearer service is only required to carry text-based pages and therefore does not require a high bandwidth.

FIG. 4 shows the voice browser 3 as co-located with the voice page server 4. In this case, voice input/output is passed across a voice network 9 between the end-user system 8 and the voice browser 3 at the voice page server site. The fact that the voice service is embodied as voice pages interpreted by a voice browser is not apparent to the user or network and the service could be implemented in other ways without the user or network being aware.

In FIG. 5, the voice browser 3 is located in the network infrastructure between the end-user system 8 and the voice page server 4, voice input and output passing between the end-user system and voice browser over one network leg, and voice-page text data passing between the voice page server 4 and voice browser 3 over another network leg. This arrangement has certain advantages; in particular, by locating expensive resources (speech recognition, TTS converter) in the network, they can be used for many different users with user profiles being used to customise the voice-browser service provided to each user.

A more specific and detailed example will now be given to illustrate how voice browser functionality can be differently located between the user and server. More particularly, FIG. 6 illustrates the provision of voice services to a mobile entity 40 which can communicate over a mobile communication infrastructure with voice-based service systems 4, 61. In this example, the mobile entity 40 communicates, using radio subsystem 42 and a phone subsystem 43, with the fixed infrastructure of a GSM PLMN (Public Land Mobile Network) 30 to provide basic voice telephony services. In addition, the mobile entity 40 includes a data-handling subsystem 45 interworking, via data interface 44, with the radio subsystem 42 for the transmission and reception of data over a data-capable bearer service provided by the PLMN; the data-capable bearer service enables the mobile entity 40 to access the public Internet 60 (or other data network). The data handling subsystem 45 supports an operating environment 46 in which applications run, the operating environment including an appropriate communications stack.

Considering the FIG. 6 arrangement in more detail, the fixed infrastructure 30 of the GSM PLMN comprises one or more Base Station Subsystems (BSS) 31 and a Network and Switching Subsystem NSS 32. Each BSS 31 comprises a Base Station Controller (BSC) 34 controlling multiple Base Transceiver Stations (BTS) 33 each associated with a respective "cell" of the radio network. When active, the radio subsystem 42 of the mobile entity 20 communicates via a radio link with the BTS 33 of the cell in which the mobile entity is currently located. As regards the NSS 32, this comprises one or more Mobile Switching Centers (MSC) 35 together with other elements such as Visitor Location Registers 52 and Home Location Register 52.

When the mobile entity 40 is used to make a normal telephone call, a traffic circuit for carrying digitised voice is set up through the relevant BSS 31 to the NSS 32 which is then responsible for routing the call to the target phone whether in the same PLMN or in another network such as PSTN (Public Switched Telephone Network) 56.

With respect to data transmission to/from the mobile entity 40, in the present example three different data-capable bearer services are depicted though other possibilities exist. A first data-capable bearer service is available in the form of a Circuit Switched Data (CSD) service; in this case a full traffic circuit is used for carrying data and the MSC 35 routes the circuit to an InterWorking Function IWF 54 the precise nature of which depends on what is connected to the other side of the IWF. Thus, IWF could be configured to provide direct access to the public Internet 60 (that is, provide functionality similar to an IAP—Internet Access Provider IAP). Alternatively, the IWF could simply be a modem connecting to PSTN 56; in this case, Internet access can be achieved by connection across the PSTN to a standard IAP.

A second, low bandwidth, data-capable bearer service is available through use of the Short Message Service that passes data carried in signalling channel slots to an SMS unit 53 which can be arranged to provide connectivity to the public Internet 60.

A third data-capable bearer service is provided in the form of GPRS (General Packet Radio Service which enables IP (or X.25) packet data to be passed from the data handling system of the mobile entity 40, via the data interface 44, radio subsystem 41 and relevant BSS 31, to a GPRS network 37 of the PLMN 30 (and vice versa). The GPRS network 37 includes a SGSN (Serving GPRS Support Node) 38 interfacing BSC 34 with the network 37, and a GGSN (Gateway GPRS Support Node) interfacing the network 37 with an external network (in this example, the public Internet 60). Full details of GPRS can be found in the ETSI (European Telecommunications Standards Institute) GSM 03.60 specification. Using GPRS, the mobile entity 40 can exchange packet data via the BSS 31 and GPRS network 37 with entities connected to the public Internet 60.

The data connection between the PLMN 30 and the Internet 60 will generally be through a gateway 55 providing functionality such as firewall and proxy functionality.

Different data-capable bearer services to those described above may be provided, the described services being simply examples of what is possible. Indeed, whilst the above description of the connectivity of a mobile entity to resources connected to the communications infrastructure, has been given with reference to a PLMN based on GSM technology, it will be appreciated that many other cellular radio technologies exist (for example, UTMS, CDMA etc.) and can typically provide equivalent functionality to that described for the GSM PLMN 30.

The mobile entity 40tself may take many different forms. For example, it could be two separate units such as a mobile phone (providing elements 42–44) and a mobile PC (providing the data-handling system 45), coupled by an appropriate link (wireline, infrared or even short range radio system such as Bluetooth). Alternatively, mobile entity 40 could be a single unit.

FIG. 6 depicts both a voice page server 4 connected to the public internet 60 and a voice-based service system 61 accessible via the normal telephone links.

The voice-based service system 61 is, for example, a call center and would typically be connected to the PSTN 56 and be accessible to mobile entity 40 via PLMN 30 and PSTN 56. The system 56 could also (or alternatively) be connected directly to the PLMN though this is unlikely. The voice-based service system 61 includes interactive voice response units implemented using voice pages interpreted by a voice browser 3A. Thus a user can user mobile entity 40 to talk to the service system 61 over the voice circuits of the telephone infrastructure; this arrangement corresponds to the situation illustrated in FIG. 4 where the voice browser is co-located with the voice page server.

If, as shown, the service system 61 is also connected to the public internet 60 and is enabled to receive VoIP (Voice over IP) telephone traffic, then provided the data handling subsystem 45 of the mobile entity 40 has VoIP functionality, the user could use a data capable bearer service of the PLMN 30 of sufficient bandwidth and QoS (quality of service) to establish a VoIP call, via PLMN 30, gateway 55, and internet 60, with the service system 61.

With regard to access to the voice services embodied in the voice pages held by voice page server 4 connected to the public internet 60, if the data-handling subsystem of the mobile entity is equipped with a voice browser 3E, then all that the mobile entity need do to use these services is to establish a data-capable bearer connection with the voice page server 4 via the PLMN 30, gateway 55 and internet 60, this connection then being used to carry the text based request response messages between the server 61 and mobile entity 4. This corresponds to the arrangement depicted in FIG. 3.

PSTN 56 can be provisioned with a voice browser 3B at internet gateway 57 access point. This enables the mobile entity to place a voice call to a number that routes the call to the voice browser and then has the latter connect to the voice page server 4 to retrieve particular voice pages. Voice browser then interprets these pages back to the mobile entity over the voice circuits of the telephone network. In a similar manner, PLMN 30 could also be provided with a voice browser at its internet gateway 55. Again, third party service providers could provide voice browser services 3D accessible over the public telephone network and connected to the internet to connect with server 4. All these arrangements are embodiments of the situation depicted in FIG. 5 where the voice browser is located in the communication network infrastructure between the user end system and voice page server.

It will be appreciated that whilst the foregoing description given with respect o FIG. 6 concerns the use of voice browsers in a cellular mobile network environment, voice browsers are equally applicable to other environments with mobile or static connectivity to the user.

Voice-based services are highly attractive because of their ease of use; however, they do require significant functionality to support them. For this reason, whilst it is desirable to provide voice interaction capability for many types of devices in every day use, the cost of doing so is currently prohibitive.

It is an object of the present invention to provide a method and apparatus by which entities can be given a voice interface simply and at low cost.

SUMMARY OF THE INVENTION

According to one aspect of the present invention, there is provided a system for enabling verbal communication on behalf of a local entity with a nearby user, the system comprising:

user equipment, intended to be carried by a user, comprising a wireless communication subsystem, and contact-data input means for receiving contact data;

contact-data providing means located at the local entity for making available to a user near the local entity or to the user equipment carried by that user, contact data identifying a voice service associated with the entity but separately hosted;

a communications infrastructure comprising at least a wireless network for communicating with the wireless communication subsystem of the user equipment;

audio output means forming part of the user equipment, or located in the locality of the local entity and connected to the communication infrastructure;

audio input means forming part of the user's equipment, or located in the locality of said entity and connected to said communications infrastructure; and a voice service arrangement for providing said voice service, the voice service arrangement being connected to said communications infrastructure such as to enable the user's equipment to contact it over the wireless network using said contact data, the voice service arrangement being operative, in response to being contacted by the user equipment, to act as voice proxy for the local entity by providing voice input and output signals over the communications infrastructure to the audio input and output means thereby enabling a user to interact with the voice service through spoken dialog with voice input by the user through the audio input means and voice output to the user through the audio output means.

According to another aspect of the present invention, there is provided a method of voice communication concerning a local entity wherein:

(a) upon a user approaching the local entity, contact data, identifying a voice service associated with the entity but separately hosted, is presented to the user or to equipment carried by the user;

(b) the contact data is used by the user's equipment to contact the voice service over a wireless network;

(c) the user interacts with the voice service through spoken dialog with both voice input by the user and voice output by the service, the voice service acting as voice proxy for the local entity.

BRIEF DESCRIPTION OF THE DRAWINGS

A method and apparatus embodying the invention, for communicating with a dumb entity, will now be described, by way of non-limiting example, with reference to the accompanying diagrammatic drawings, in which.

BEST MODE OF CARRYING OUT THE INVENTION

In the following description, voice services are described based on voice page servers serving pages with embedded voice markup tags to voice browsers. Unless otherwise indicated, the foregoing description of voice browsers, and their possible locations and access methods is to be taken as applying also to the described embodiments of the invention. Furthermore, although voice-browser based forms of voice services are preferred, the present invention in its widest conception, is not limited to these forms of voice service system and other suitable systems will be apparent to persons skilled in the art.

In both embodiments of the invention to be described below with references to FIGS. 7 and 8 respectively, a dumb entity (here a plant 71, but potentially any object, including a mobile object) is given a voice dialog capability by associating with the plant 71 a beacon device 72 that sends out contact data (either periodically or when it detects persons close by) using a short-range wireless communication system such as an infrared system or a radio-based system (for example, a Bluetooth system), or a sound-based system. The contact data enables suitably-equipped persons nearby to contact a voice service associated with the plant— the voice service thus acts as a voice dialog proxy for the plant and gives the impression to the persons using the service that they are conversing with the plant.

Figure 1:
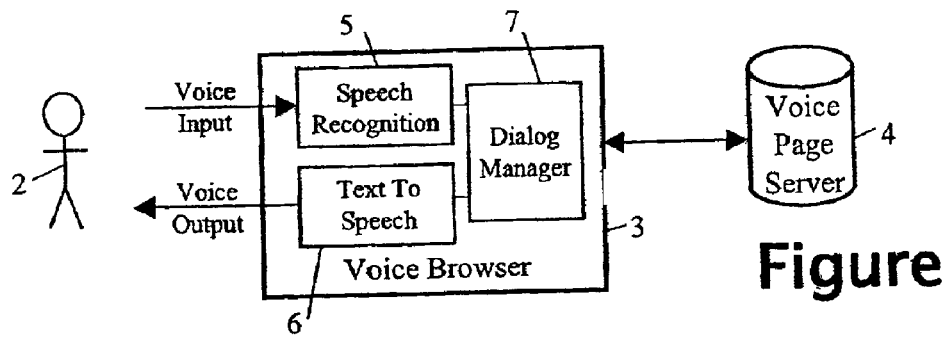
FIG. 1 is a diagram illustrating the role of a voice browser.
Figure 3:
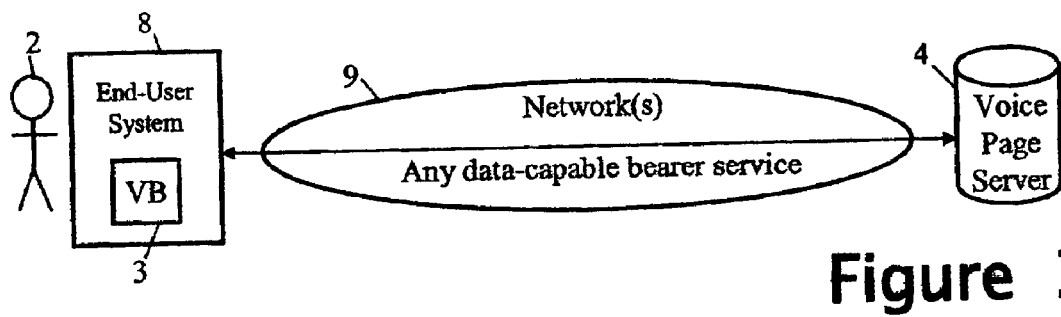
FIG. 3 is a diagram showing a voice service implemented with voice browser functionality located in an end-user system.
Figure 4:
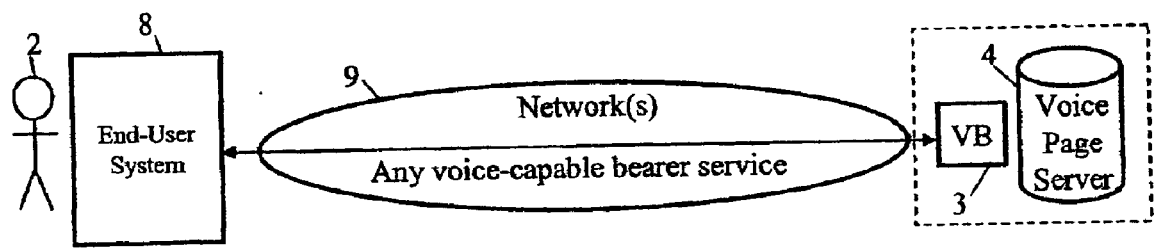
FIG. 4 is a diagram showing a voice service implemented with voice browser functionality co-located with a voice page server.
Figure 5:
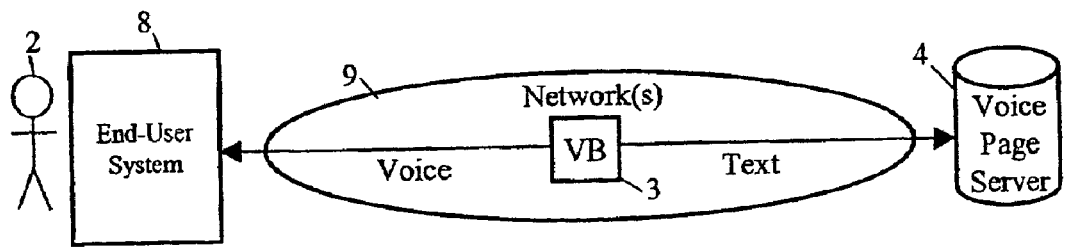
FIG. 5 is a diagram showing a voice service implemented with voice browser functionality located in a network between the end-user system and voice page server.
Figure 2:
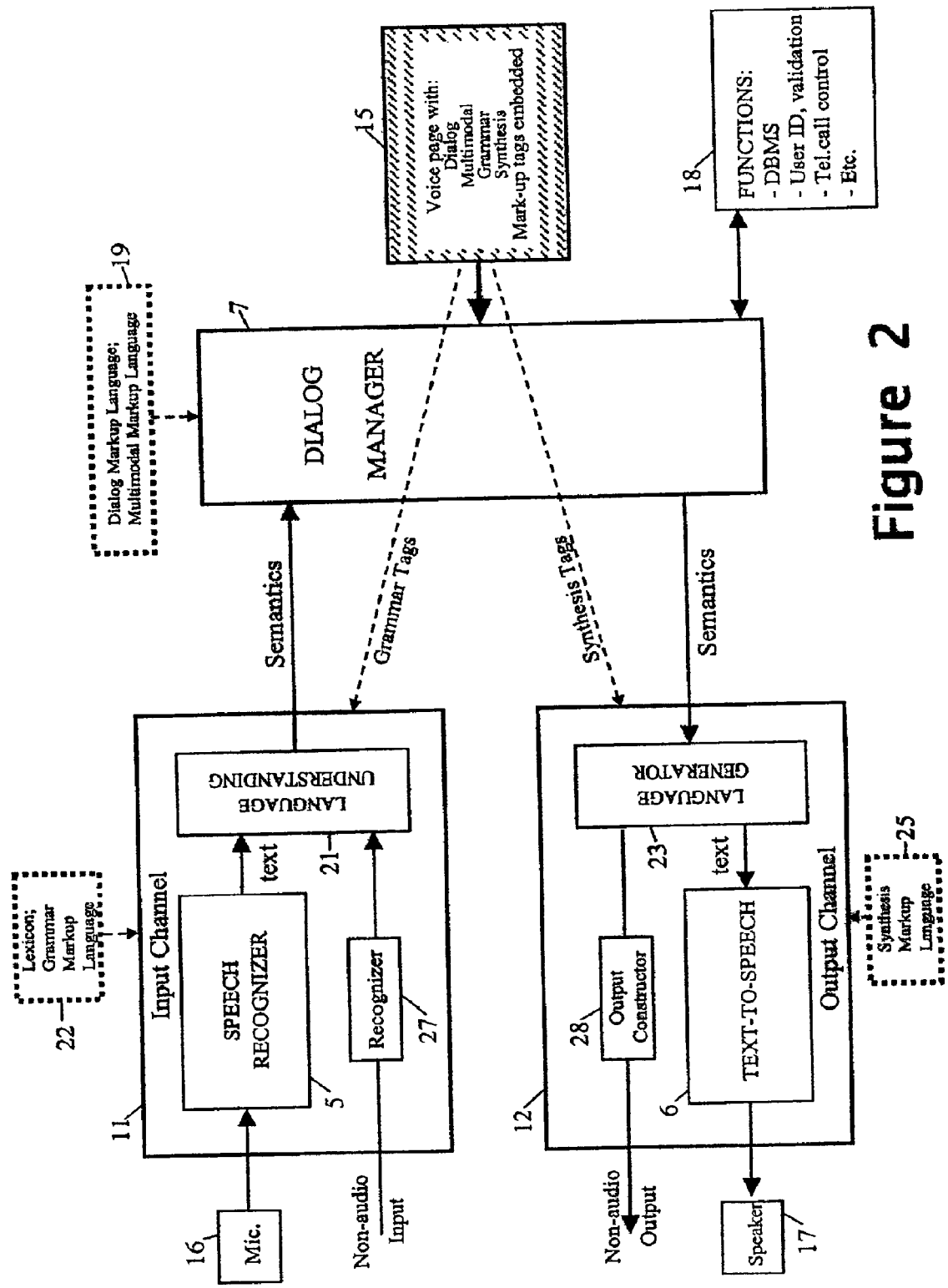
FIG. 2 is a diagram showing the functional elements of a voice browser and their relationship to different types of voice markup tags.
Figure 6:
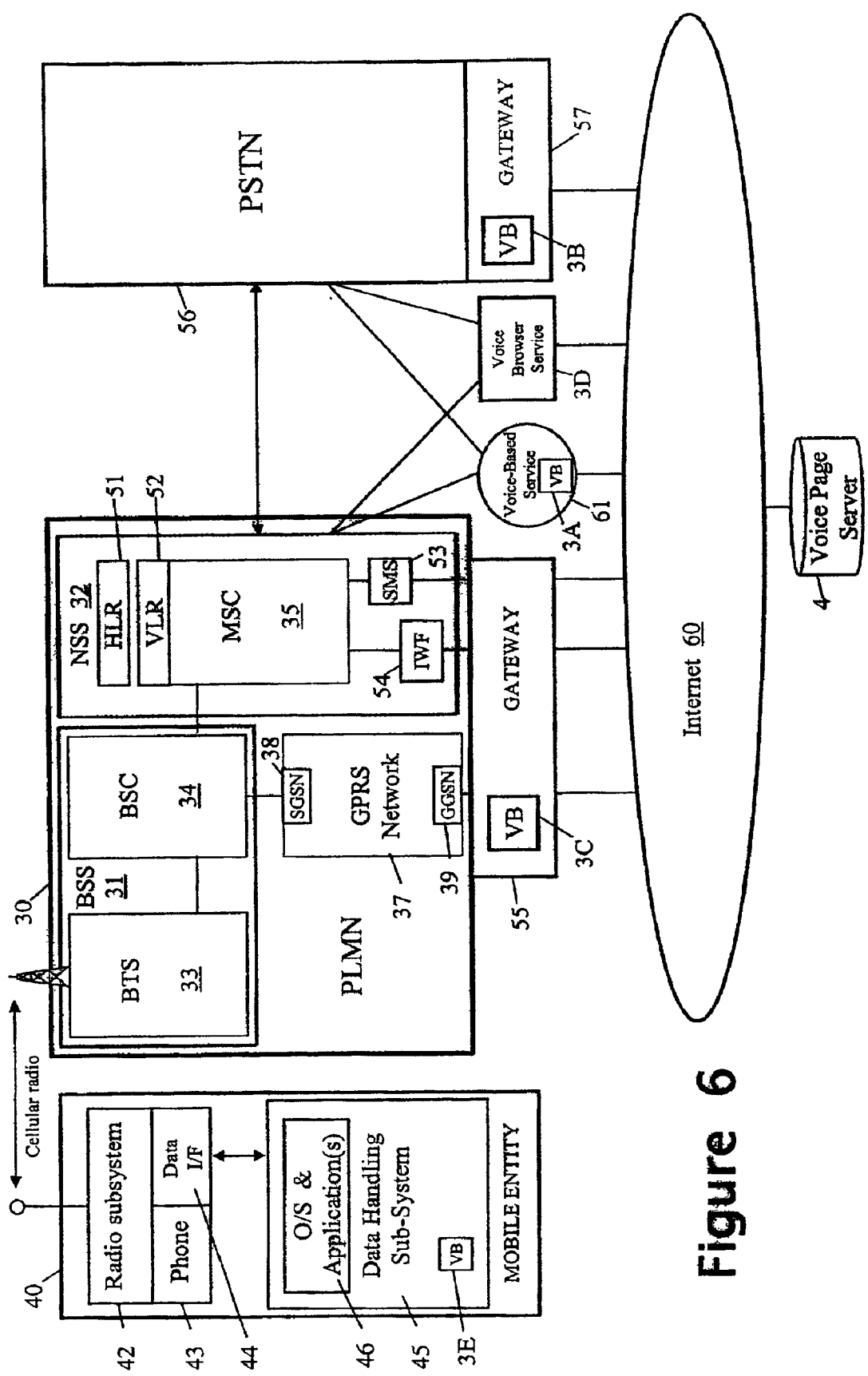
FIG. 6 is a diagram of a mobile entity accessing voice services via various routes through a communications infrastructure including a PLMN, PSTN and public internet.
Figure 7:
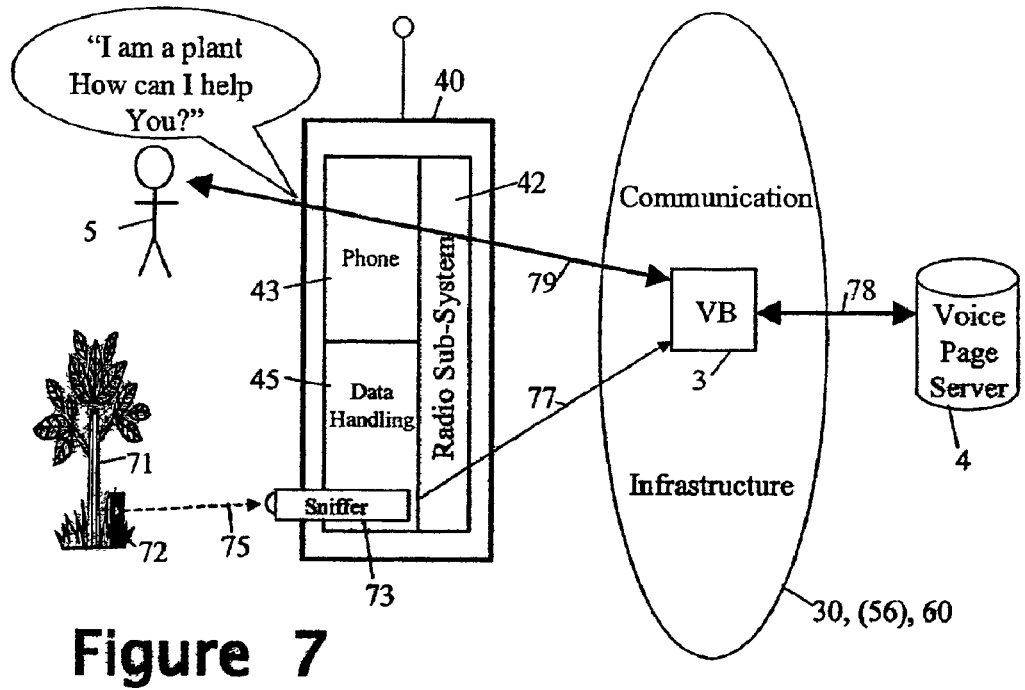
FIG. 7 is a diagram of a first embodiment of the invention involving a mobile phone for accessing a remote voice page server.

Considering the FIG. 7 embodiment first in more detail, a user 5 is equipped with a mobile entity 40 similar to that of FIG. 6 but provided with a 'sniffer' 73 for picking up contact data transmitted by the beacon device 72 (see arrow 75). The contact data is then used by the mobile entity 40 to contact a voice service provided by a voice page server 4 that is connected to the public internet and accessible from mobile entity 40 across the communication infrastructure formed by PLMN 30, PSTN 56 and internet 60. As already described with reference to FIG. 6, a number of possible routes exist through the infrastructure between the mobile entity and voice page server 4 and three ways of using these routes will now be outlined, it being assumed that the voice browser used for interpreting the voice pages served by server 4 is located in the communications infrastructure.

A) The contact data is a URL specific to the voice service for the plant 71. This URL is received by sniffer 73 and passed to an application running in the data handling subsystem 45 which passes the URL and telephone number of the mobile entity 40 to the voice browser 3 over a data-capable bearer connection set up through the communication infrastructure from the mobile entity 40 to the voice browser 3. This results in the voice browser 3 calling back the mobile entity 40 to set up a voice circuit between them and, at the same time, the browser accesses the voice page server 4 to retrieve a first page of the voice service associated with the plant 71. This page (and any subsequent pages) are then interpreted by the voice browser with voice output being passed over the voice circuit to the phone subsystem 43 and thus to user 5, and voice input from the user being returned over the same circuit to the browser. This is the arrangement depicted by the arrows 77 to 79 in FIG. 7 with arrow 77 representing the initial contact passing the voice service URL and mobile entity number to the voice browser, arrow 78 depicting the exchange of request/response messages between the browser 3 and server 4, and arrow 79 representing the exchange of voice messages across the voice circuit between the voice browser 3 and phone subsystem of mobile entity 40. A variant of this arrangement is for the mobile entity to initially contact the voice page server directly, the latter then being responsible for contacting the voice browser and having the latter set up a voice circuit to the mobile entity.

B) The contact data is a URL specific to the voice service for the plant 71. This URL is received by sniffer 73 and passed to an application running in the data handling subsystem 45 which passes the URL to the voice browser 3 over a data capable bearer connection established through the communication infrastructure from the mobile entity 40 to the voice browser 3. The browser accesses the voice page server 4 to retrieve a first page of the voice service associated with the plant 71. This page (and any subsequent pages) are then interpreted by the voice browser with voice output being passed as VoIP data to the data-handling subsystem of the mobile entity 40 using the same data-capable bearer connection as used to pass the voice-service URL to the browser 3. Voice input from the user is returned over the same bearer connection to the browser.

C) The contact data is a telephone number specific to the voice service for the plant 71. This telephone number is received by sniffer 73 and passed to an application running in the data handling subsystem 45 which causes the phone subsystem to dial the number. This results in a voice circuit being set up to the voice browser 3 with the browser then accessing the voice page server 4 to retrieve a first page of the voice service associated with the plant 71. This page (and any subsequent pages) are then interpreted by the voice browser with voice output being passed over the voice circuit to the phone subsystem 43 and thus to user 5, and voice input from the user being returned over the same circuit to the browser.

Where the mobile entity 40 is itself equipped with a voice browser 3 then, of course, initial (and subsequent) voice pages can be fetched from the voice page server 4 over a data-capable bearer connection set up through the communications infrastructure. In this case, where resources (suc as memory or processing power) at the mobile entity are restricted, the same connection can be used by the voice browser to access remote resources as may be needed, including the pulling in of appropriate lexicons and grammar specifications.

Since the FIG. 7 arrangement uses infrastructure resources that are generally only available at a cost to the user, the data handling subsystem can be arranged to prompt the user for approval via a user interface of the mobile entity 40 before contacting a voice service.

The nature of the voice service and, in particular the dialog followed, will of course, depend on the nature of the dumb entity being given a voice capability. In the present case of a plant 71, the dialog may be directed at informing the user about the plant and its general needs. In fact, by associating sensors with the plant that feed information to the beacon device 72, the current state and needs of the plant can be passed to the voice service—for example, as name-value pairs included in a query string associated with the URL in (A) and (B) above. The information about the current state and needs of the plant are stored by the voice service (for example, as session data either at the voice browser or voice page server) and enables the voice service to be conditioned to the state and needs of the plant. The FIG. 8 embodiment concerns a restricted environment (here taken to be a home environment but potentially any other proprietary space such as an office or similar) where a home server system 80 includes a voice page server 4 and associated voice browser 3, the latter being connected to a wireless interface 82 to enable it to communicate with devices in the home over a home wireless network. In this embodiment, the contact data output by the beacon device 72 associated with plant 71 (see arrow 85) is a URL of the relevant voice service page on server 4. This LURL is picked up by a URL sniffer 83 carried by user 5 and the URL is relayed over the home wireless network to the home service system and, in particular to the voice browser 3 (see arrow 86). This results in the browser 3 accessing the voice page server 4 to retrieve a first page of the voice service associated with the plant 71. This page (and any subsequent pages) are then interpreted by the voice browser with voice output being passed over the home wireless network to a wireless headset 90 of the user (see arrow 89); voice input from the user 5 is returned over the wireless network to the browser.

As with the FIG. 7 embodiment, the voice browser could be incorporated in equipment carried by the user.

Variants

Many variants are, of course, possible to the arrangements described above with reference to FIGS. 7 and 8. For example, rather than using a beacon to present the voice-service contact data to the user, any one or more of the following alternatives can be used:

machine-readable markings representing the contact data are located on or adjacent the entity and are scanned into the user's equipment (a scanner replaces the sniffer of the described embodiments);

a visual, audible or other human-discernable representation of the contact data is presented to the user with the latter then inputting the contact data in their equipment. (a user input device replaces the sniffer of the described embodiments).

Typically, the user will be close enough to the dumb entity to be able to establish voice communication (were the dumb entity capable of it) before receiving the contact data.

In another variant, rather than voice input and output being effected via the user equipment (mobile entity for the FIG. 7 embodiment, wireless headset 90 for the FIG. 8 embodiment), this is done using local loudspeakers and microphones connected by wireline or by the wireless network with the voice browser. Alternatively, voice input and output can be differently implemented from each other with, for example, voice input being done using a microphone carried by the user and voice output done by local loudspeakers.

By having multiple local loudspeakers, and assuming that their locations relative to the plant 71 were known to the voice browser system or other means used to provide audio output control, the voice browser can control the volume from each speaker to make it appear as if the sound output was coming from the plant at least in terms of azimuth direction. This is particularly useful where there are multiple voice-enabled dumb entities in the same area.

A similar effect (making the voice output appear to come from the dumb entity) can also be achieved for users wearing stereo-sound headsets provided the following information is known to the voice browser (or other element responsible for setting output levels between the two stereo channels):

location of the user relative to the entity (this can be determined in any suitable manner including by using a system such as GPS to accurately position the user, the location of the entity being fixed and known); and the orientation of the user's head (determined, for example, using a magnetic flux compass or solid state gyros incorporated into the headset).

Figure 9:
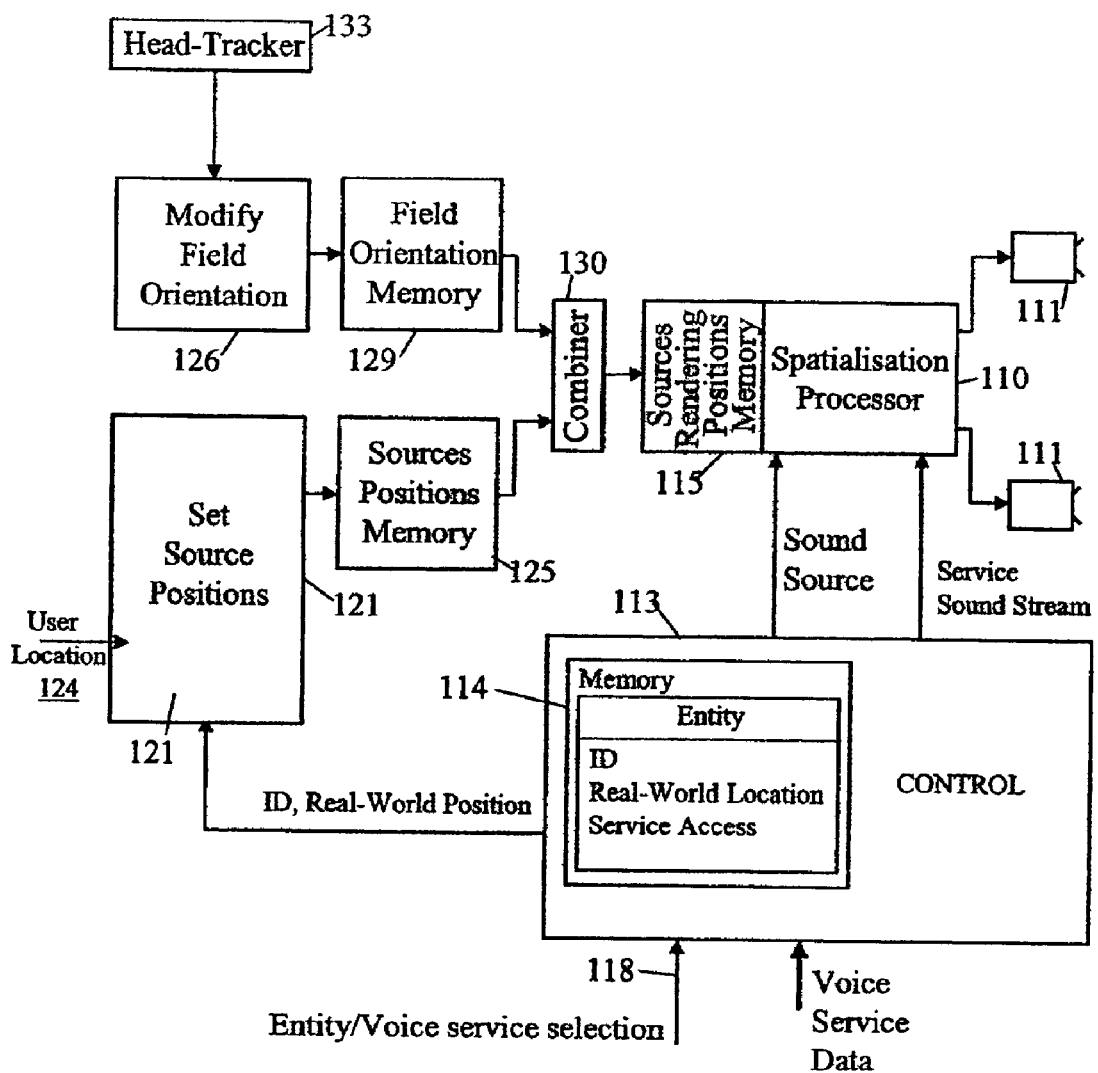
FIG. 9 is a functional block diagram of an audio-field generating apparatus.

FIG. 9 shows apparatus that is operative to generate, through headphones, an audio field in which the voice service of a currently-selected local entity is presented through a synthesised sound source positioned in the audio field so as to appear to coincide (or line up) with the entity, the audio field being world-stabilised so that the entity-representing sound source does not rotate relative to the real world as the user rotates their head or body.

The heart of the apparatus is a spatialisation processor 110 which, given a desired audio-field rendering position and an input audio stream, is operative to produce appropriate signals for feeding to user-carried headphones 111 in order to generate the desired audio field. Such spatialisation processors are known in the art and will not be described further herein.

The FIG. 9 apparatus includes a control block 113 with memory 114. Dialog output is only permitted from one entity (or, rather, the associated voice service) at a time, the selected entity/voice service being indicated to the control block on input 118. However, data on multiple local entities and their voice services can be held in memory, this data comprising for each entity: an ID, the real-world location of the entity (provided directly by that entity or from the associated voice service), and details of the associated voice service. For each entity for which data is stored in memory 114, a rendering position is determined for the sound source that is to be used to represent that entity in the audio field as and when that entity is selected.

The FIG. 9 apparatus works on the basis that the position of each entity-representing is specified relative to an audio-field reference vector, the orientation of which relative to a presentation reference vector can be varied to achieve the desired world stabilisation of the sound sources. The presentation reference vector corresponds, for a set of headphones, to the forward facing direction of the user and therefore changes its direction as the user turns their head. The user is at least notionally located at the origin of the presentation reference vector.

The spatialisation processor 110 uses the presentation reference vector as its reference so that the rendering positions of the sound sources need to be provided to the processor 110 relative to that vector. The rendering position of a sound source is thus a combination of the position of the source in the audio field judged relative to the audio-field reference vector, and the current rotation of the audio field reference vector relative to the presentation reference vector.

Because headphones worn by the user rotate with the user's head, the synthesised sound sources will also appear to rotate with the user unless corrective action is taken. In order to impart a world stabilisation to the sound sources, the audio field is given a rotation relative to the presentation reference vector that cancels out the rotation of the latter as the user turns their head. This results in the rendering positions of the sound sources being adjusted by an amount appropriate to keep the sound sources in the same perceived locations so far as the user is concerned. A suitable head-tracker sensor 133 (for example, an electronic compass mounted on the headphones) is provided to measure the azimuth rotation of the user's head relative to the world to enable the appropriate counter rotation to be applied to the audio field.

Referring again to FIG. 9, the determination of the rendering position of each entity-representing sound source in the output audio field is done by injecting a sound-source data item into a processing path involving elements 121 to 130. This sound-source data item comprises an entity/sound source ID and the real-world location of the entity (in any appropriate coordinate system. Each sound-source data item is passed to a set-source-position block 121 where the position of the sound source is automatically determined relative to the audio-field reference vector on the basis of the supplied position information.

The position of each sound source relative to the audio field reference vector is set such as to place the sound source in the field at a position determined by the associated real-world location and, in particular, in a position such that it lies in the same direction relative to the user as the associated real-world location. To this end, block 121 is arranged to receive and store the real-world locations passed to it from block 113, and also to receive the current location of the user as determined by any suitable means such as a GPS system carried by the user, or nearby location beacons. The block 121 also needs to know the real-world direction of pointing of the un-rotated audio-field reference vector (which, as noted above, is also the direction of pointing of the presentation reference vector). This can be derived for example, by providing a small electronic compass on the headphones 111 (this compass can also serve as the head tracker sensor 133 mentioned above); by noting the rotation angle of the audio-field reference vector at the moment the real-world direction of pointing of vector 44 is measured, it is then possible to derive the real-world direction of pointing of the audio-field reference vector.

The decided position for each source is then temporarily stored in memory 125 against the source ID.

Of course, as the user moves in space, the block 121 needs to reprocess its stored real-world location information to update the position of the corresponding sound sources in the audio field. Similarly, if updated real-world location information is received from a local entity, then the positioning of the sound source in the audio field must also be updated.

Audio-field orientation modify block 126 determines the required changes in orientation of the audio-field reference vector relative to presentation reference vector to achieve world stabilisation, this being done on the basis of the output of the afore-mentioned head tracker sensor 133. The required field orientation angle determined by block 126 is stored in memory 129.

Each source position stored in memory 125 is combined by combiner 130 with the field orientation angle stored in memory 129 to derive a rendering position for the sound source, this rendering position being stored, along with the entity/sound source ID, in memory 115. The combiner operates continuously and cyclically to refresh the rendering positions in memory 115.

The spatialisation processor 110 is informed by control block 113 which entity is currently selected (if any). Assuming an entity is currently selected, the processor 110 retrieves from memory 115 the rendering position of the corresponding sound source and then renders the sound stream of the associated voice service at the appropriate position in the audio field so that the output from the voice service appears to be coming from the local entity.

The FIG. 9 apparatus can be arranged to produce an audio field with one, two or three degrees of freedom regarding sound source location (typically, azimuth, elevation and range variations). Of course, audio fields with only azimuth variation over a limited arc can be produced by standard stereo equipment which may be adequate in some situations.

The FIG. 9 apparatus is primarily intended to be part of the user's equipment, being arranged to spatialise a selected voice service sound stream passed to the equipment either as digitized audio data or as text data for conversion at the equipment, via a text-to-speech converter, into a digitized audio stream. However, it is also possible to provide the apparatus remotely from the user, for example, at the voice browser, in which case the user is passed spatialized audio streams for feeding to the headphones.

Making the voice service output appear to come from the dumb entity itself as described above enhances the user experience of talking to the entity itself It maybe noted that this experience is different and generally superior to merely being provided with information in audio form about the entity (such as would occur with the audio rendering of a standard web page without voice mark up); instead, the present voice services enable a dialog between the user and the entity with the latter preferably being represented in first person terms.

Knowing the user's position or orientation relative to the entity as described above also enables the voice service to be adapted accordingly. For example, a user approaching the back of an entity (typically not a plant) may receive a different voice output from the voice service as compared to a user approaching from the front. Similarly, a user facing away from the entity may be differently spoken to by the entity as compared to a user facing the entity. Also, a user crossing past the entity may be differently spoken to as compared to a user moving directly towards the entity or a user moving directly away from the entity (that is, the voice service is dependent on the user's 'line of approach'—this term here being taken to include line of departure also). The user's position/orientation/line-of-approach relative to the entity can be used to adapt the voice service either on the basis of the user's initial position/orientation/approach to the entity or on an ongoing basis responsive to changes in the user's position/orientation/approach. Information regarding the relative position of the user to the entity does not necessarily require the use of user-location determining technology or magnetic flux compasses or gyroscopes—the simple provision of multiple directional beacon devices can be used to cause the user to pick up different contact data depending on their position relative to the entity. Indeed, the beacon devices need not even be directional if they are each located away from the entity along a respective approach route.

Where there are multiple voice-enabled dumb entities in the same area, the equipment carried by the user or the voice browser is preferably arranged to ignore new contact data coming from an entity if the user is still in dialog with another entity (in this respect, end of a dialog can be determined either as a sufficiently long pause by the user, a specific termination command from the user, or a natural end to the voice dialog script). To alleviate any problems with receiving contact data from multiple dumb entities that are close to each other, the sniffer 73,83 is preferably made highly directional in nature, this being readily achieved where the short-range communication is effected using infrared.

By arranging for the identity of the user to be passed to the voice browser or voice page server when contact is first made with the voice service, profile data on the user (if available) can be looked up by a database access and used to customise the service to the user.

Other variants are also possible. For example, the user on contacting the voice service can be joined into a session with any other users currently using the voice service in respect of the same entity such that all users at least hear the same voice output of the voice service. This can be achieved by functionality at the voice page server (session management being commonly effected at web page servers) but only to the level of what page is currently served to each user. It is therefore preferred to implement this common session feature at a voice browser thereby ensuring all users hear the same output at the same time. With respect to voice input by session members, there will generally be a need for the voice service to select one input stream in the case that more than one member speaks at the same time. The selected input voice stream can be relayed to other members by the voice browser to provide an indication as to what input is currently being handled; unselected input is not relayed in this manner.

An extension of this arrangement is to join the user into a session with any other users currently using the voice service in respect of the same local entity and other entities that have been logically associated with that entity, the voice inputs and outputs to and from the voice service being made available to all such users. Thus, if two similar plants that are not located near each other are logically associated, users in dialog with both plants are joined into a common session.

The voice-enabled 'dumb' entity can be provided with associated functionality that is controlled by control data passed from the voice service via a short-range link between the user equipment and beacon device. This control data is for example, scripted into the voice pages embedded in multimodal tags for extraction by the voice browser. The control data can be passed to the user's equipment from the voice service in a variety of ways depending in part whether or not the voice browser is located in the user equipment—if it is, then the control data is, of course, passed in the voice pages. If the voice browser is separate from the user equipment, then the control data can be embedded as audio signals in the voice output from the browser or communicated via a separate data channel.

Where the 'dumb' entity has an associated mouth-like feature movable by associated functionality, the control data from the voice service can be used to cause operation of the mouth-like device in synchronism with voice output from the voice service. Thus a dummy can be made to move its mouth in synchronism with dialog it is uttering via its associated voice service. This feature, which has application in museums and like attractions, is preferably used with the aforementioned arrangement of joining users in dialog with the same entity into a common session—since the dummy can only move its mouth in synchronism with one piece of dialog at a time, having all interested persons in the same session and selecting which user voice input is to be responded to, is clearly advantageous.

The mouth-like feature and associated functionality can conveniently be associated with the dumb entity by incorporation into the beacon device and can exist in isolation from any other "living" feature. The mouth-like feature can be either physical in nature with actuators controlling movement of physical parts of the feature, or simply an electronically-displayed mouth (for example displayed on an LCD display). The coordination of the mouth-like feature with the voice service output aids people with hearing difficulties to understand what is being said.

Figure 8:
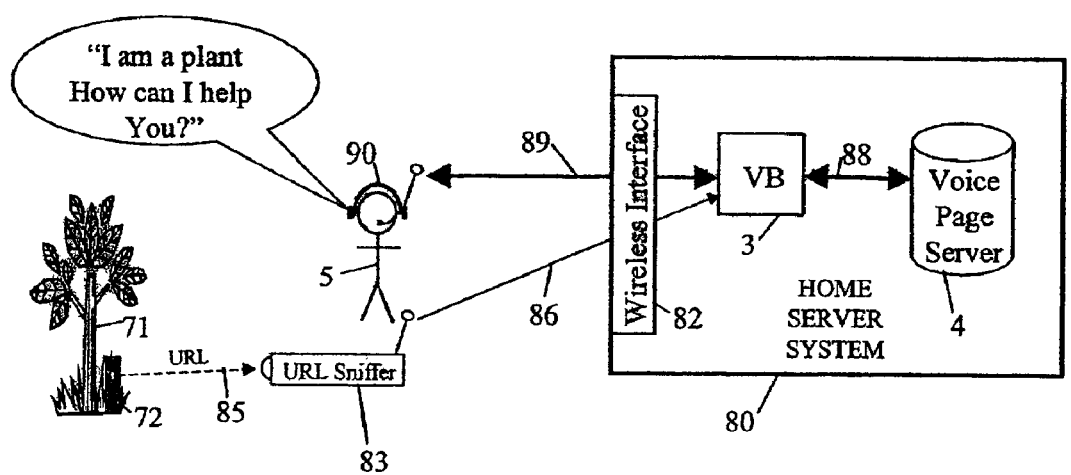
FIG. 8 is a diagram of a second embodiment of the invention involving a home server system.

Of course, as well as using multimodal tags for control data to be passed to the entity, more normal multimodal interactions (displays, keyboard, pointing devices etc.) can be scripted in the voice service provided by the voice page server in the embodiments of FIGS. 7 and 8.

What is claimed is:

1. A system for enabling verbal communication on behalf of a local entity with a nearby user, the system comprising:
   user equipment, intended to be carried by a user, comprising a wireless communication subsystem, and a contact-data input subsystem for receiving contact data;
   a contact-data providing arrangement located at the local entity for making available to a user near the local entity or to the user equipment carried by that user, contact data identifying a voice service associated with the entity but separately hosted;
   a communications infrastructure comprising at least a wireless network for communicating with the wireless communication subsystem of the user equipment;
   an audio output arrangement forming part of the user equipment, or located in the locality of the local entity and connected to the communication infrastructure;
   an audio input arrangement forming part of the user's equipment, or located in the locality of said entity and connected to said communications infrastructure;
   a voice service arrangement for providing said voice service, the voice service arrangement being connected to said communications infrastructure such as to enable the user's equipment to contact it over the wireless network using said contact data, the voice service arrangement being operative, in response to being contacted by the user equipment, to act as voice proxy for the local entity by signals exchanged over the communications infrastructure with the audio input and output arrangements thereby enabling a user to interact with the voice service through spoken dialog with voice input by the user through the audio input arrangement and voice output to the user through the audio output arrangement;
   controllable functionality associated with the local entity; and
   a short-range-communications arrangement comprising complimentary elements at the local entity and in the user equipment for establishing a short range wireless link between the user equipment and said controllable functionality; the user equipment being arranged to receive control data from the voice service arrangement in the course of the latter acting as a voice proxy for the local entity, and to pass on the control data via said short-range wireless link to said controllable functionality whereby to enable this functionality to be controlled by the voice service arrangement in coordination with said voice output.

2. A system according to claim 1, wherein the contact-data providing arrangement is a beacon device located at or near the local entity and operative to communicate with the contact-data input subsystem of the user's equipment over said short-range wireless link.

3. A system according to claim 2, wherein the beacon device is operative to include parameter values relating to the state of said local entity in said contact data, the user equipment being operative to pass these parameter values via the wireless network to the voice service arrangement for use in conditioning the output of the voice service.

4. A system according to claim 2, wherein multiple beacon devices are associated with the entity with each beacon device being arranged to communicate different contact data, the voice service arrangement being arranged to adapt the voice output of the voice service delivered in respect of said local entity in dependence on the contact data of the beacon device first or most recently picked up by the user equipment.

5. A system according to claim 1, wherein both the audio input and output arrangement form part of the user equipment, the user equipment being operative to exchange said voice input and voice output with the voice service as voice signals passed across the wireless network.

6. A system according to claim 5, wherein the user equipment includes a mobile phone providing the said wireless communication subsystem and said audio input and output arrangements.

7. A system according to claim 5, wherein the voice service arrangement comprises:
  a voice page server for serving voice pages in the form of text with embedded voice markup tags; and
  a voice browser comprising:
  a speech recognizer for carrying out speech recognition of user voice input received as voice signals;
  a dialog manager for effecting dialog control on the basis of output from the speech recognizer and pages served by the voice page server; and
  a text-to-speech converter operative to convert voice pages into voice output signals under the control of the dialog manager;
the user equipment including a mobile phone providing the said wireless communication subsystem and said audio input and output arrangements, the wireless network being a mobile phone wireless network.

8. A system according to claim 7, wherein the voice browser is not part of the user's equipment and the contact data comprises a telephone number usable by the mobile phone to connect over a voice circuit of the wireless network to the voice browser, the voice browser being responsive to being connected to by the mobile phone to access the voice page server and to thereafter use said voice circuit for the exchange of voice input and/or output between the user and voice browser.

9. A system according to claim 7, wherein the voice browser is not part of the user's equipment and the contact data is in the form of a URL, the mobile phone being operable to pass this URL, via a data-capable bearer service of the wireless network, to the voice service arrangement; the voice service arrangement being operative to thereupon use its voice browser to call back the user on the mobile phone using a voice circuit of the wireless network that is then used for voice input and/or output between the user and voice browser.

10. A system according to claim 7, wherein the voice browser is not part of the user's equipment and the contact data is in the form of a URL, the mobile phone being operable to pass this URL, via a data-capable bearer service of the wireless network, to the voice service arrangement; the voice service arrangement being thereafter operative to use the data-capable bearer service for voice input and/or output between the user and voice browser using a packetized voice protocol.

11. A system according to claim 7, wherein the voice browser is part of the user's equipment and the contact data is in the form of a URL, the voice browser being operative to use this URL to access, via a data-capable bearer service of the mobile-phone wireless network, the voice page server; the voice service arrangement being thereafter operative to use the data-capable bearer service for passing text based input and/or output between the voice browser and voice page server.

12. A system according to claim 1, wherein said audio output arrangement comprises multiple sound output devices spaced from said local entity, and a controller for controlling excitation of these devices such as to produce a sound output that it appears to the user to emanate from the location of said local entity independently of the user's position and head orientation relative to the entity.

13. A system according to claim 12, wherein said multiple sound output devices are headphones worn by the user, the controller being arranged to control excitation of the headphones in dependence on the relative positions of the user and entity and rotations of the user's head.

14. A system according to claim 12, wherein said multiple sound output devices are loudspeakers associated with the locality of the entity rather than with the user and connected with the voice service through a communications infrastructure, the controller being arranged to control excitation of the loudspeaker in dependence on the relative positions of the users and entity.

15. A system according to claim 1, wherein said audio output arrangement comprises headphones forming part of the user equipment, said controllable functionality comprising a mouth representation device associated with the local entity and arranged to present a mouth representation that is movable dependence on the control data from the voice service whereby to operate in synchronism with voice output from the voice service.

16. A system according to claim 15, wherein the mouth representation device iselectro-mechanical in form with movable mouth parts, said controllable functionality further comprising electrically-powered actuators for moving said mouth parts.

17. A system according to claim 15, wherein the mouth representation device comprises an electronic display for displaying a mouth image.

18. A system according to claim 1, wherein the contact-data providing arrangement comprise markings that are located on or adjacent the entity and represent the contact data, the contact-data input subsystem of the user's equipment comprising a scanner for reading the markings.

19. A system according to claim 1, wherein the contact-data providing arrangement is arranged to present the contact data to the user visually or audibly, the contact-data input subsystem of the user's equipment comprising a user-operable input arrangement through which the user can input the contact data into their equipment.

20. A system according to claim 1, wherein in said dialog the entity is represented in first person terms through the voice service.

21. A system according to claim 1, wherein both the audio input and output arrangements are located in the locality of said entity apart from the user equipment, the voice service arrangement being operative to exchange said voice input and voice output with the audio input and output devices as voice signals passed across the communications infrastructure.

22. A system according to claim 1, wherein the audio input arrangement forms part of the user equipment and the latter is arranged to pass said voice input as voice signals across the wireless network to the voice service, the audio output arrangement being located in the locality of said entity apart from the user equipment and the voice service arrangement being arranged to pass said voice output as voice signals to the audio output arrangement across the communications infrastructure.

23. A system according to claim 1, wherein the voice service arrangement comprises:
  a voice page server for serving voice pages in the form of text with embedded voice markup tags; and a voice browser comprising:
- a speech recognizer for carrying out speech recognition of user voice input received as voice signals;
- a dialog manager for effecting dialog control on the basis of output from the speech recognizer and pages served by the voice page server; and
- a text-to-speech converter operative to convert voice pages into voice output signals under the control of the dialog manager.

24. A system according to claim 1, wherein the wireless network is a proprietary-space local network hosting the voice service arrangement, the local entity being located in the proprietary-space concerned.

25. A system according to claim 5, wherein the wireless network is a proprietary-space local network hosting the voice service arrangement, the local entity being located in the proprietary-space concerned.

26. A system according to claim 25, wherein said audio output arrangement comprises headphones worn by the user and a controller for controlling excitation of the headphones in dependence on the relative positions of the user and entity and rotations of the user's head such that the sound output appears to the user to emanate from the location of said local entity independently of the user's position and head orientation relative to the entity.

27. A system according to claim 1, further comprising an arrangement for determining the orientation of the local entity as perceived from the user's current location, the voice service being operative to condition its output in dependence on the determined orientation of the local entity.

28. A system according to claim 1, further comprising an arrangement for determining the orientation of the user relative to the entity, the voice service being operative to condition its output in dependence on the user's determined orientation.

29. A system according to claim 1, further comprising an arrangement for determining the line of approach or departure of the user relative to the entity, the voice service being operative to condition its output in dependence on the user's line of approach or departure.

30. A method of interacting with a local entity wherein:
(a) upon a user approaching the local entity, contact data, identifying a voice service associated with the entity but separately hosted, is presented to the user or to user-carried equipment
(b) the contact data is used by the user's equipment to contact the voice service over a wireless network;
(c) the user interacts with the voice service through spoken dialog with both voice input by the user and voice output by the service;
(d) the voice service controls the operation of functionality associated with the local entity by means of control data passed to the functionality over a short-range wireless link from the user-carried equipment whereby to coordinate operation of the functionality with said voice output.

31. A method according to claim wherein the contact data is presented to the user's equipment by means of a beacon device located at or near the local entity and communicating with the user's equipment over said short-range wireless link.

32. A method according to claim 31, wherein the beacon device includes parameter values relating to the state of said local entity in said contact data, these parameter values being passed in (b) over the wireless network to the voice service where they are used in conditioning the output of the voice service.

33. A method according to claim 31, wherein multiple beacon devices are associated with the entity each arranged to communicate different contact data, the voice service adapting its voice output in respect of said local entity in dependence on the contact data of the beacon device first or most-recently picked up by the user-equipment.

34. A method according to claim 30, wherein sound output is through multiple sound output devices spaced from said local entity and controlled so that the sound appears to the user to emanate from the location of said local entity independently of the user's position and head orientation relative to the entity.

35. A method according to claim 34, wherein said multiple sound output devices are headphones worn by the user, excitation of the headphones being controlled to take account of the relative positions of the user and entity and rotations of the user's head.

36. A method according to claim 34, wherein said multiple sound output devices are loudspeakers associated with the locality of the entity rather than with the user and connected with the voice service through the communications infrastructure, excitation of the loudspeakers being controlled in dependence on the relative positions of the user and entity.

37. A method according to claim 30, wherein:
the voice service is effected by the serving of voice pages in the form of text with embedded voice markup tags to a voice browser, the voice browser interpreting these pages and carrying out speech recognition of user voice input, text to speech conversion to generate voice output, and dialog management; the voice browser being disposed between a voice page server and the user; and
the user equipment includes a mobile phone, (b) involving contacting the voice service using the mobile phone and (c) involving the mobile phone to transfer voice service input and output to and from the user.

38. A method according to claim 37, wherein the voice browser is not part of the user's equipment and the contact data comprises a telephone number which when dialled by the mobile phone connects over a voice circuit to the voice browser and causes the latter to access the voice page server, the voice circuit being subsequently used for the exchange of voice input and/or output between the user and voice browser.

39. A method according to claim 37, wherein the voice browser is not part of the user's equipment and the contact data is in the form of a URL which in (b) the mobile phone passes, via a data-capable bearer service of the mobile-phone wireless network, to the voice service; the voice service then using the voice browser to call back the user on the mobile phone using a voice circuit that is then used in (c) for voice input and/or output between the user and voice browser.

40. A method according to claim 37, wherein the voice browser is not part of the user's equipment and the contact data is in the form of a URL which in (b) the mobile phone passes, via a data-capable bearer service of the mobile-phone wireless network, to the voice service; the data-capable bearer service being subsequently used in (c) for voice input and/or output between the user and voice browser using a packetized voice protocol.

41. A method according to claim 37, wherein the voice browser is part of the user's equipment and the contact data is in the form of a URL which in (b) the voice browser uses to access, via a data-capable bearer service of the mobile-phone wireless network, the voice page server; the data-capable bearer service being subsequently used in (c) for passing text based input and/or output between the voice browser and voice page server.

42. A method according to claim 30, wherein the wireless network is a proprietary-space local network hosting the voice service, the local entity being located in the proprietary-space concerned.

43. A method according to claim 42, wherein the user equipment includes a wireless headset which in (c) is used for exchanging voice input and output with the voice service over the same wireless network as used in (b).

44. A method according to claim 30, wherein the voice output of the voice service is output via headphones of the user equipment, said controllable functionality comprising a mouth representation device associated with the local entity and arranged to present a mouth representation that is movable in dependence on the control data from the voice service whereby to operate in synchronism with voice output from the voice service.

45. A method according to claim 44, wherein the mouth representation device is incorporated into the beacon device.

46. A method according to claim 44, wherein the mouth representation device is electro-mechanical in form with movable mouth parts operated by electrically-powered actuators in dependence on said control data.

47. A method according to claim 44, wherein the mouth representation device comprises an electronic display for displaying a mouth image.

48. A method according to claim 30, wherein the contact data is presented to the user's equipment by the scanning into the equipment of markings that are located on or adjacent the entity and represent the contact data.

49. A method according to claim 30, wherein the contact data is visually or audibly presented to the user with the latter then inputting the contact data in their equipment.

50. A method according to claim 30, wherein both said voice input and voice output are carried across the wireless network between the voice service and sound input and output devices forming part of the user's equipment.

51. A method according to claim 30, wherein both said voice input and voice output are exchanged with the user by local sound input and output devices that are associated with the locality of the entity rather than with the user and are connected with the voice service through a communications infrastructure.

52. A method according to claim 30, wherein said voice input is carried across the wireless network to the voice service from a sound input device forming part of the user's equipment, and said voice output is effected through at least one local sound output device that is associated with the locality of the entity rather than with the user and is connected with the voice service through a communications infrastructure.

53. A method according to claim 30, wherein the voice service is effected by the serving of voice pages in the form of text with embedded voice markup tags to a voice browser, the voice browser interpreting these pages and carrying out speech recognition of user voice input, text to speech conversion to generate voice output, and dialog management; the voice browser being disposed between a voice page server and the user.

54. A method according to claim 30, wherein the user equipment includes a mobile phone, (b) involving contacting the voice service using the mobile phone and (c) involving the mobile phone to transfer voice service input and output to and from the user.

55. A method according to claim 30, wherein the carrying out of (b) is subject to user approval at the time.

56. A method according to claim 30, wherein the user equipment ensures that the user is only connected to one voice service at a time regardless of how many local entities with beacon devices are within pickup range.

57. A method according to claim 30, wherein in (b) the identity of the user is sent to the voice service and used by the latter to look up user profile data which is then used to customise the voice service to the user.

58. A method according to claim 30, wherein the voice output provided from the service in (c) is dependent on the orientation of the local entity as perceived from the user's current location.

59. A method according to claim 30, wherein the voice output provided from the service in (c) is dependent on the user's orientation relative to the entity.

60. A method according to claim 30, wherein the voice output provided from the service in (c) is dependent on the user's line of approach or departure relative to the entity.

* * * * *